United States Patent
Masten

(10) Patent No.: US 7,362,423 B2
(45) Date of Patent: Apr. 22, 2008

(54) DIGITAL DIAGNOSTIC APPARATUS AND VISION SYSTEM WITH RELATED METHODS

(75) Inventor: Billy R. Masten, Shallowater, TX (US)

(73) Assignee: Masten Opto-Diagnostics Company, Lubbock, TX (US)

( * ) Notice: Subject to any disclaimer, the term of this patent is extended or adjusted under 35 U.S.C. 154(b) by 314 days.

(21) Appl. No.: 10/655,711

(22) Filed: Sep. 4, 2003

(65) Prior Publication Data

US 2004/0047509 A1 Mar. 11, 2004

Related U.S. Application Data

(60) Provisional application No. 60/408,711, filed on Sep. 6, 2002.

(51) Int. Cl.
*G06K 9/74* (2006.01)
*G01N 21/00* (2006.01)

(52) U.S. Cl. .................. 356/71; 356/237.1; 356/237.2

(58) Field of Classification Search .................. 356/71
See application file for complete search history.

(56) References Cited

U.S. PATENT DOCUMENTS

| | | | | |
|---|---|---|---|---|
| 3,909,602 A | * | 9/1975 | Micka | 716/4 |
| 4,542,829 A | * | 9/1985 | Emery et al. | 209/534 |
| 5,528,363 A | * | 6/1996 | Fachinger et al. | 356/326 |
| 6,377,699 B1 | * | 4/2002 | Musgrave et al. | 382/117 |
| 6,919,959 B2 | * | 7/2005 | Masten | 356/328 |

* cited by examiner

*Primary Examiner*—Gregory J. Toatley, Jr.
*Assistant Examiner*—Amanda H Merlino
(74) *Attorney, Agent, or Firm*—Dorsey L. Baker

(57) ABSTRACT

A high speed, low cost, apparatus and method of identification, examination of objects and quality control of manufactured parts and sheet materials, the apparatus including a comparator having memory storage of data representative of the surface of a first "standard" spatial linear distribution of light and memory storage of data representative of another portion of the surface, and including an algorithm for comparing data of the standard with data representative of the second spatial linear distribution of light reflected from a surface to determine if there is a correlation between the two spatial distributions.

29 Claims, 5 Drawing Sheets

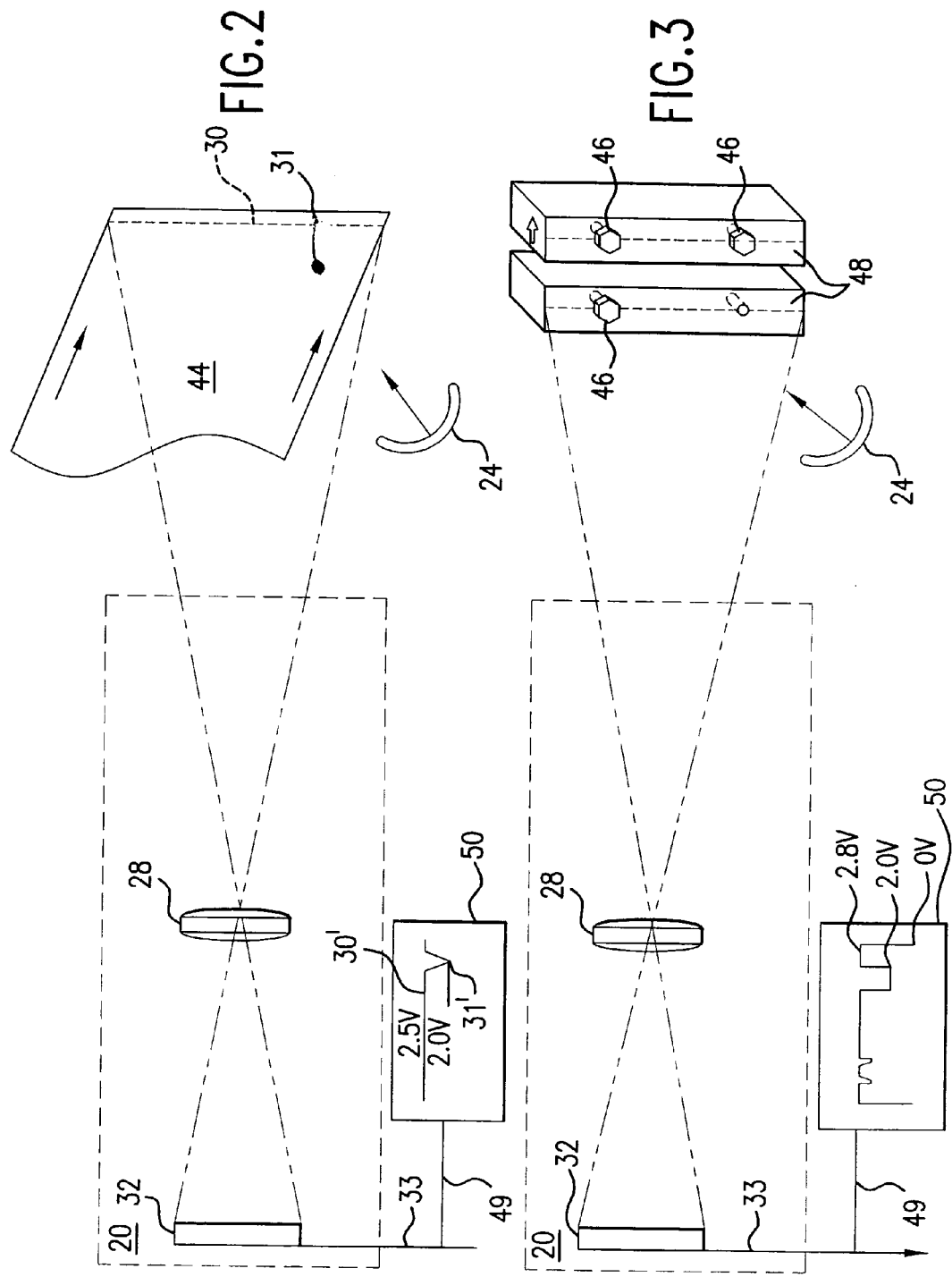

DIGITAL DIAGNOSTIC APPARATUS AND VISION SYSTEM WITH RELATED METHODS

This application claims the benefit of U.S. Provisional Application No. 60/408,711 filed Sep. 6, 2002.

FIELD OF THE INVENTION

This invention is primarily directed to an electronic apparatus and method for identifying and quantifying objects, their dimensions, condition or their conformity to specifications. It includes a sensor unit having a digital identifier or diagnostic unit. More particularly, the preferred embodiment is directed to an instrument for diverse functions such as: 1) determination of dimensions and conformity to specifications of parts formed of various materials, 2) inspection for abnormalities of a surface of flat materials including plastic, metal and woven and non-woven web and sheet, 3) identification of the type or quality of surfaces of a sheet material, 4) identification of the denomination of bills in a bill changer or counter and similar functions, and 5) determination of the presence or absence of components in a metal, plastic or wired assembly. The inventions disclosed are also applicable to other needs such as those of security and safety. For example, the inventions can sense intruders into an area and detect unsafe conditions such as a fire or failure of machine press operator to remove his hands from a press before it is closed.

In short, this invention is intended to be a low cost, fast and efficient alternative to the typical "machine vision" systems as well as to many of the "sensor" market systems although it will have application and uses in other fields as well. In part, the inventions disclosed and claimed herein are extensions and improvements of my earlier inventions disclosed in U.S. patent application Ser. No. 09/849,831 entitled DIGITAL SPECTRAL IDENTIFIER-CONTROLLER AND RELATED METHODS filed May 4, 2001 as a Continuation-In-Part application which has, as a primary focus, a method of identification of plants and objects using a color spectrum.

THE PRIOR ART

As understood, the prior art machine vision and sensor units used in production processes to identify dimensional flaws, missing parts, and improper assembly are relatively complex, intricate and expensive. They include cameras having linear or area array sensors that capture images of the part under consideration at high speeds. These images are then communicated in analog or digital form to a costly frame grabber that may be mounted in a computer such as a PC. The PC must be programmed with software so as to identify the flaws, missing parts, etc. Such software often includes various algorithms to rotate the image of the part and to make calculations regarding the part. In addition, the computer must be loaded with input data relating to design data such as the drawings and dimensions of the part under consideration. The software then reads the output of the array, (which is usually converted to digital form by the frame grabber), and compares it with the design data to check for flaws, missing parts and dimensions. Not only are these systems complex and expensive, they are believed to require considerable setup time. Representative of these systems are those sold by companies such as DVT Corporation of Norcross, Ga. and Cognex Corporation of Natick, Mass.

SUMMARY OF INVENTION

The present inventions are primarily directed to a less complex, low cost sensor and diagnostic apparatus that is easy to setup and maintain. The preferred embodiment includes a housing having a lens for receiving light and focusing it upon a sensor array. The pixels of sensor array receive light, generate a voltage and then communicate the magnitude of the light received by each pixel, as indicated by the developed voltage, to an analog to digital converter and then to an electronic comparator. This comparator takes the form of a logic chip with associated memory devices. Such may include the conventional microprocessor, a microcontroller, or a Digital Signal Processor (DSP), etc. These items, the array, the A-D converter and logic chip with memory, comprise the basic system hardware of my vision inventions. It is expected that the cost of the functional components, in volume, of this basic system may be less than ten dollars. In addition to this hardware, these inventions, however, also include software that preferably takes the form of one basic algorithm designed to run a relatively simple correlation calculation.

These inventions also include fast and efficient set up methods of using this system for the purposes of identification of flaws, verification of presence or absence of components, checking the dimensions of a part and of evaluating the surfaces of web materials formed plastics, woven materials, non-woven materials and metal for abnormalities such as spots and tears, etc. To avoid the input of data from drawings, the set up methods of my inventions focus on a "compare to standard" method rather than manual input of digital data from specifications and data. For example, to inspect a metal piece part for conformity, a good part is first made and checked for quality by a firm's quality control department. This checked item then becomes the standard against which other parts will be compared. Thus, a good part, not data from drawings or specifications, are used as the preferred standard of comparison although those skilled in the art will appreciate that the diagnostic unit may well function by making comparisons from input data.

This "compare to standard" method includes the steps of placing a product, object or surface, that is known to meet all quality standards, in front of the sensor or vision unit. Light reflected from the product, object or surface passes through the lens to impinge upon the sensor array, i.e., a series of pixels, to produce a spatial distribution of light thereon. Each pixel thus receives a portion of the spatial distribution and generates a voltage to indicate the intensity or magnitude of the light reflected from a small linear portion of the object, surface or product to define a spatial or linear fingerprint of the object along a line of the standard object. An output reflecting the linear fingerprint of the object is communicated to a "standard" memory location of the logic chip.

Thereafter, additional products, objects or surfaces from the population to the evaluated are passed under the vision system such that subsequent fingerprints of the remainder of the population are taken and placed into a different memory. The logic chip runs the software algorithm to compare the spatial distribution of the standard fingerprint with the spatial distribution of the object or additional products and produces an output signal from the logic chip to indicate the similarity or dissimilarity between the standard and the additional objects.

In addition to a focus upon one or more linear segments of a part, my invention can focus on an area by using an area array and running the regression analysis on the area by taking each line or each column of the area in sequence. Alternatively, my inventions can focus on a point of the "standard" part as well as upon a line extending across the part. The focal point focus is a method of checking the quality and sufficiency of a coating at a series of points on the metal part while the linear segments may continue to check dimensions, presence or absence, surface irregularities, etc. As will be shown this simultaneous coating and linear verification of a part may also be accomplished by the use of an area array. Importantly, the inventions of this application may be combined with the inventions of application Ser. No. 09/849,831 to simultaneously provide a full color spectral comparison and a black and white or grey scale comparison.

When using a linear array, these inventions are not limited to single line scan on each part. To the contrary, the inventions may confirm the quality of a substantial portion of the part, web or sheet of material. As the part comes down the conveyor at a speed of one part or one inch per second, these inventions may take a linear scan across part or web at a rate of several thousand scans or lines per second and each can be compared with the "standard" fingerprint immediately. As a result of multiple scans at high speeds, the quality and nature of the entirety of an object can be considered.

Accordingly, the goals and objectives of this invention are to provide, among other things, one or more of the following:

1) a high speed, simplistic method for identifying objects, their dimensions, condition and their conformity to specifications;
2) a low cost system and apparatus for identifying objects, their dimensions, condition and their conformity to a standard sample rather than specification data which must be manually input into a PC or other memory device;
3) a method and a system for identifying objects and species of objects, their dimensions, condition and their conformity to specifications with a minimum of setup time and programming or data input;
4) a very accurate method and apparatus for identifying objects and species of objects, their dimensions, condition and their conformity to specifications;
5) low cost, high speed methods and apparatus for surface inspection of web, sheet and extrusions of metals, plastics woven and non-woven fabrics for tears, spots, stains, and other abnormalities;
6) a simple, lost cost, high speed minimum maintenance apparatus and method for identifying, grading or selecting objects, plant and animal tissue by their spatial reflections of light;
7) a low cost spatial scanning, sensing and identification unit that can use common or standard software for identification of objects, their dimensions, condition and their conformity to specifications;
8) a low cost scanning and sensing device having a target or aiming system to identify an object whose spatial image is being generated;
9) a light scanning and sensor unit having a digital identifier for selectively identifying and evaluating objects, plant and animal tissue of different colors for purposes of evaluation, processing, etc.
10) A light sensor and diagnostic unit that can be used to scan a point, sequential lines or an area of a object, and run a correlation analysis to confirm that the point, lines or area of the object or its surface conforms to a standard;
11) a low cost machine vision unit that eliminates the need for and cost of such items as frame grabbers, personal computers, costly data input and the creation of algorithms;
12) a low cost and fast methods of installation that can avoid or minimize data input and the creation of new algorithms;
13) a low cost security device that may be set to scan a target area or background and to identify changes in the background such as, for example, an intruder into the scanned area;
14) a lost cost safety device that may be set to scan a target area of machinery and presses and to sound an alarm or stop a press when a person's hands would be injured by the closing of the machinery or the press; and
15) a light sensor and diagnostic unit that minimizes the requirement for set up time, data or software input and relies primarily on a "compare to standard" method of part or surface diagnostics.

DESCRIPTION OF THE DRAWINGS

The manner in which these objectives and other desirable characteristics can be obtained from this invention is explained in the following specification and attached drawings in which:

FIG. 2 is the block diagram of FIG. 1 illustrating the application of the preferred embodiment to surface inspection of a web or extrusion of sheet material;

FIG. 3 is the block diagram of FIG. 1 illustrating the application of the preferred embodiment to test the presence or absence of a component part (bolt) of an assembly;

DETAIL DESCRIPTION

Figure 1:
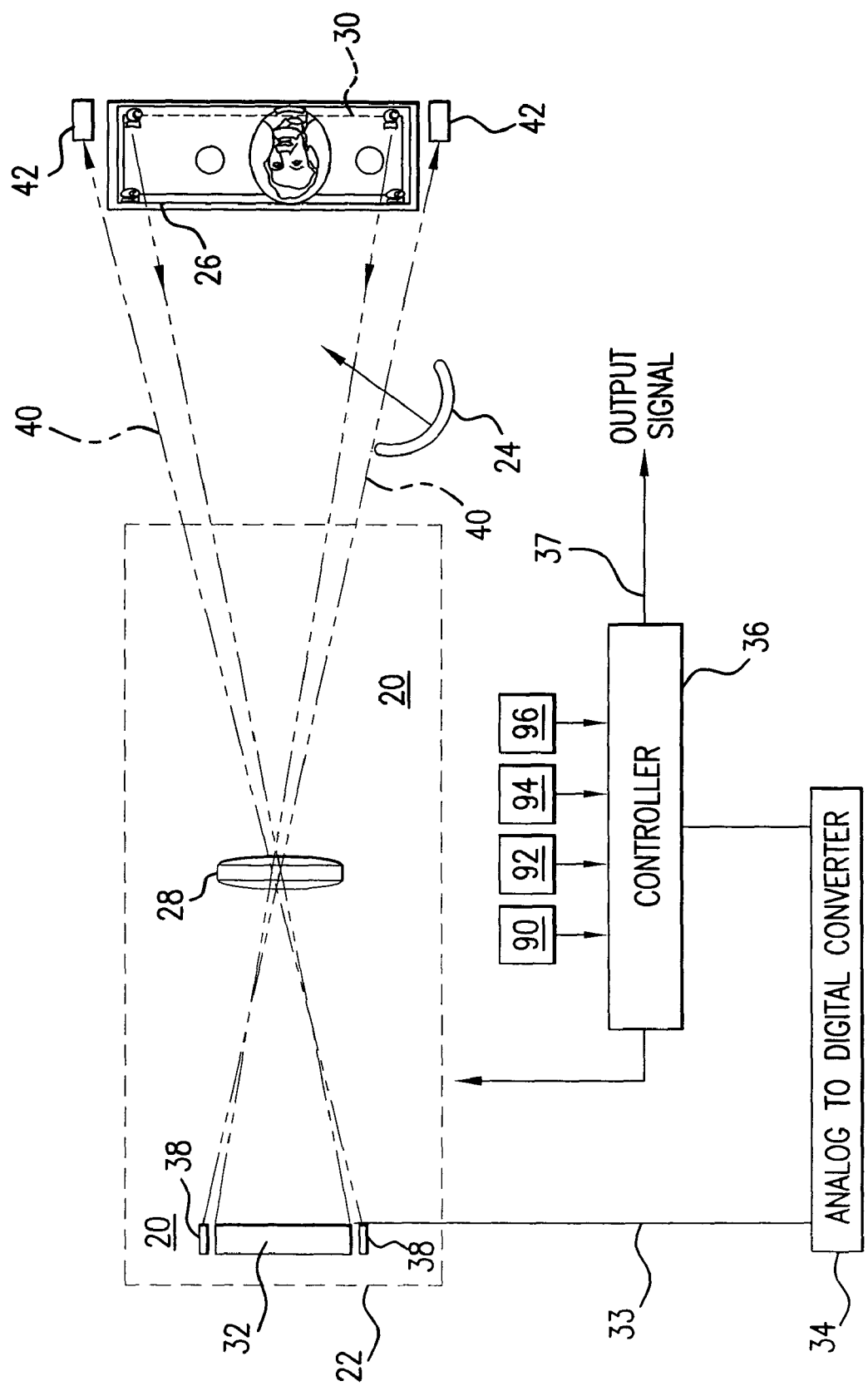
FIG. 1 is a block diagram depicting the major components of a preferred embodiment of the vision system illustrating its application to bill identification.

As depicted in FIG. 1, a preferred embodiment of the sensor or vision system 10 comprises a sensor unit 20 having a housing 22. Within the housing is a lens 28 that receives reflected light from an object 26 whose identity is desired. In this alternative, the object 26 for identification is a five dollar bill. The light may be natural light, or if the unit is mounted in an enclosed bill changer or counter (not shown), the light may be generated by a lamp 24. The lens 28 focuses the reflected light from along a line 30 on the bill to a sensor or linear array 32 such as part no. TSL 1301 from Texas Advanced Optoelectronic Solutions of Plano, Tex. This unit has 102 pixels, each of which comprises a PN junction. In operation, each of these pixels develops a voltage that correlates to the quantity or intensity of a spatial segment of light reflected from along the line 30 on the five dollar bill. The magnitude of the developed voltage of each pixel can be read by a logic chip, controller or comparator 36 such as a microprocessor, microcontroller, or preferably a Digital Signal Processor (DSP), such as DSP Model No TM320F243 which is made and sold by Texas Instruments of Dallas, Tex. In the first instance, a switch 94 is provided to enable the user to manually instruct the logic chip 36 to pulse the sensor array 32 to obtain a spatial distribution of the "standard" five dollar bill 26. This pulse signal will sequentially generate an analog output from all of the pixels of the sensor array 32 and transmit them through an analog to digital converter to the Controller 36 to obtain in digital format the magnitude of the voltage developed by each pixel. As stated later, if the DSP Model TM320F243 is selected as the controller 36, such has a built in A-D converter. The digital information or "fingerprint" of the standard is then placed into one of the memory elements of the Controller or Digital Signal Processor (DSP) 36 for storage and comparison purposes. When stored (memorized), the Controller or DSP 36 then has a spatial distribution or "fingerprint" of the wavelengths reflected by the true five dollar bills 26 to be identified as additional bills are inserted into the bill changer or counter. This first memorized print thus becomes the "standard" against which subsequent fingerprints are compared. Those skilled in the art will appreciate that, to insure greater, more reliable accuracy, two or more "standards" could be taken of the five dollar bill by moving the bill to a second or third position to the right and pulsing a second switch 96 to gain an additional fingerprint standard. Each "standard" would be placed into a separate memory element of the Controller 36 or into additional memory element associated with the Controller.

Thereafter, subsequent bills are placed into the bill changer or counter and they are moved into the same position as that shown for the sample bill 26. Spatial distributions from these subsequent bills are sequentially obtained, placed in memory, and then compared with the spatial distributions of one or more samples. As will be explained, the controller or DSP 36 is programmed with an algorithm to perform this comparison function.

To quickly obtain accurate identification of the five dollar bills inserted into a bill changer, the Controller 36 is programmed to initialize reading the individual pixels of the linear sensor array 32 at a relatively high speed, such as once every 25 milliseconds. Thereafter, each clock pulse of the clock of the Controller or DSP 36 will serially read the voltage generated by each pixel or sensor to define a spatial linear image, frame or fingerprint of any subsequent bill placed into the changer or counter. As with the standard, this voltage is converted to digital information and then stored in other data memory locations of the Controller 36. After the sensors are read and their output stored in the DSP 36, the memorized or ("standard") spatial distribution is compared with the spatial distribution of that reflected by the last bill. While only a few wavelengths could be compared to obtain a reasonably accurate determination of the similarity of the standard spatial distribution with that of the subsequent bill, this invention uses all of the 102 pixels and resulting data points made available by the TSL 1301.

Preferably, the comparison of the "standard" fingerprint with the subsequent spatial distributions is performed by a regression analysis algorithm that is programmed into the Comparator or DSP 36 or into an associated memory. Thus, as the bill is moved to the right as shown in FIG. 1, numerous spatial distributions of the bill will be developed by the linear array 32. These distributions are repeatedly obtained from the array by the comparator 36 upon initiation of a clock pulse and a comparison of each new distribution is made with the standard. Since a DSP can obtain these distributions and make these comparisons at a rate of several thousand per second, the bill can be moved or conveyed across the lens relatively fast and yet permit sufficient comparisons to determine the existence of a match between any distribution and the standard, regardless of the position of the line from which the standard was taken. If the coefficient of correlation between the standard spatial distribution and any of the subsequent linear spatial distributions of the subsequent input bill is high or greater than the pre-set limit so as to reflect similarity or identity, the Controller 36 generates an output on lead 37 to count the bill as another five dollar bill or to provide change therefore or to provide a signal to initiate some other function.

If desired, a low cost target or aiming system can be added to the sensor unit 20 to identify for the user the position of the spatial line on the bill that is about to be scanned into memory as the standard. For example, a light emitting diode (LED) 38 can be placed on opposite ends of the linear array 32 and light from the LED's will focus a beam 40 and mark a spot 42 on each end of the spatial line from which the scan is taken. Such target spots will provide the user with visual and immediate feedback that the reflecting line 30 is on the bill.

As suggested earlier, two or more separate "standard" reflecting lines 30 may be scanned from the bill and used as a fingerprint to provide greater certainty that the bill is a five dollar bill. As the bill is moved by a conveyor or roller system (not shown) to the right, additional light data scans can be made and each will be compared with the "standard" scans to determine if there is a similarity or identity between a line on the present bill and that of the bill from which the standard was taken. If more than one standard is taken, an "and" gate (not shown) be used to couple the two output signals together to insure that all subsequent five dollar bills have two lines that matched the two fingerprinted standards. With the preferred DSP, several thousand comparisons could be made each second and the user would notice no delay.

As another alternative, many Controllers 36 can be selected that have sufficient memory to hold a plurality of "standard" reflection lines and such may be taken from several denominations such as one dollar bills, five dollar bills and ten dollar bills. Accordingly, with each additional bill that was placed in the bill changer or counter, the same correlation algorithm could be run for each standard. The output of the Controller could be modified to indicate if the bill is a one, five or ten dollar bill and provide appropriate change.

FIG. 2 illustrates another application of these inventions. In this application, the invention is being used to inspect a web material 44 of plastic, paper, woven or non-woven fabric or sheet metal. As in the prior application, a "standard" spatial distribution is taken along the line 30 and placed into the memory of the Controller 36. The material on this "standard" line is unblemished, contains no imperfections and fully meets the manufacturer's specifications. After the standard is placed into memory, the Controller 36 initiates the taking of additional spatial reflections as the web is moved in the direction of the arrow. The Controller 36 first places the additional spatial reflection in memory and then runs a similarity or regression algorithm to insure that subsequent light reflections are identical to or similar to the standard distribution of reflected light. If not, an output signal is emitted from the Controller 36 as on lead line 37. In addition, in this embodiment, an analog scope is shown connected to the output lead 33 from the linear array 30. As long as the web meets the "standard", the scope will reflect a straight horizontal line modified by the uniformity of the illuminated light. However, when the web moves to the right such that the reflected line 30 is over a spot 31, the reflected light will not be similar to or correlate with the "standard" placed in memory. This lack of correlation will be reflected by the analog scope by a decrease in voltage levels as shown at 31'. In addition, the Controller 36 connected to the output line 33 of the array will emit an output signal showing a lack of correlation-and a defect in the web.

FIG. 3 depicts another application of the inventions. This application is to test the presence or absence of components, (bolts 46) of an assembly 48. In this application, a standard was taken of an assembly in which two bolts 46 were properly placed in the assembly. Thereafter, subsequent assemblies 48 will be conveyed under the spatial reflection line 30. When the second assembly 48 reaches the spatial reflection line, the Controller 36 will emit an output signal indicating a lack of similarity or correlation with the standard. Consequently and preferably, an output signal will be generated by the comparator 36 to indicate the dissimilarity and an actuator (not shown) will push the defective part off the conveyor. At the same time, the analog screen connected to lead 33 coming from the linear array 32 will show a substantial drop in voltage.

Figure 4:
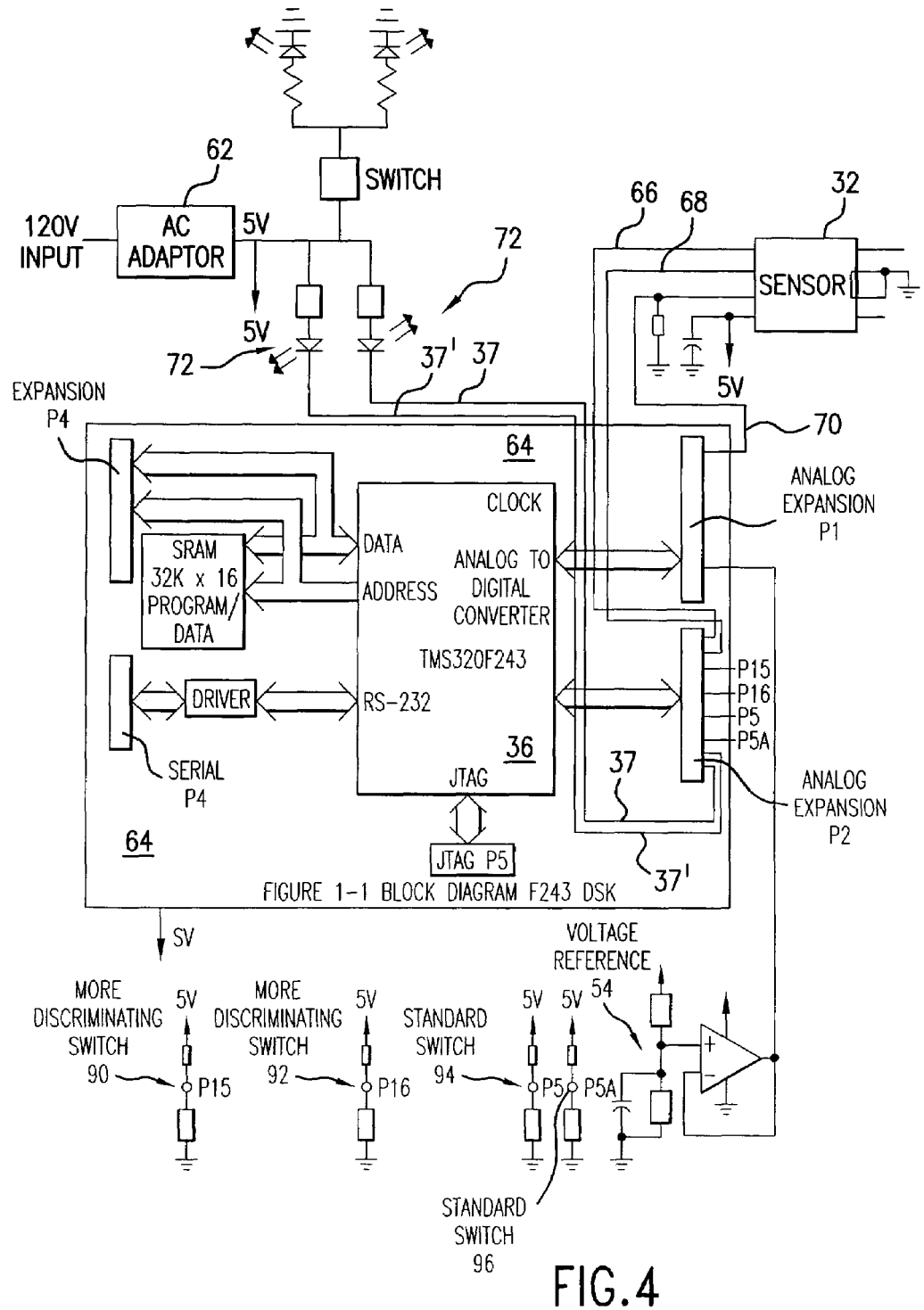
FIG. 4 is a circuit diagram of the preferred electronic schematic layout including the controller or diagnostic unit which may be used in the apparatus and method for sensing and machine vision.

FIG. 4 depicts an electronic circuit board 64 having mounted thereon a comparator such as a Digital Signal Processor (DSP) 36 that has been demonstrated to be effective for the purpose of these inventions. The circuit board 64 is provided with 5 volt power supply from an AC adapter 62. In additional to its processor structure, the DSP 36 has, onboard, a clock, an analog to digital converter, an I/O unit, and memory. In addition, this DSP also has a 232 port, expansion memory, analog expansion and I/O expansion together with a JTAG port for receiving the algorithm program and placing it into the memory of the DSP 36.

In operation, leads 66 and 68 prepare (SI) and initiating (CLK) data communication of the magnitude of the voltage contained in each of the pixels of the sensor array 32. This accumulated data is communicated to the analog-to-digital (A-D) converter of the DSP via lead 70. The A-D converter converts the analog signal to a binary digital signal and delivers the result to a memory address of the DSP 36. A timer built into the DSP 36 repeatedly generates a clock pulse to take a new fingerprint of its visual area and deliver the fingerprint or spectral distribution in binary form back to the DSP or micro-controller 36. With a proper light or lamp 24, a new fingerprint or spatial distribution can be developed on the sensor unit 32 at a rate as high as several thousand per second.

When an identified part, web, bill, etc. has been checked for quality and conformance to a desired standard, it is placed below the array 32 and the user pushes "Standard" switch 94. This action identifies the part as a "standard" and places its spatial distribution of reflected light in a first, standard or "fingerprint" memory on the DSP 36. After the "standard" is set, the unit is ready to look at and evaluate subsequent parts, bills, webs, etc. that the user wishes to identify or evaluate.

After each spatial distribution is fed into the DSP 36, it runs a preprogrammed regression analysis to determine the coefficient of correlation between the spatial distribution of the memorized standard and the spectral distribution of the object. The regression algorithm can easily be written by those skilled in the art and loaded into the DSP 36 through the JTAG port. This algorithm is a conventional regression calculation used to determine the degree of similarity of linear curve defined by one set of spatial data points with the linear curve defined by another set of data points. If one is looking to identify five dollar bills, the program must be designed to generate an output signal whenever the coefficient of correlation is equal to or greater than a predetermined value. Then the DSP 36 emits an output signal through the DSP bus to the I/O expansion board which closes a "normally" open switch to lead 37 that activates an LED 72 or other appropriate device such as a counter or a change machine. Preferably the result of the correlation computation is converted to an integer factor that is representative of the coefficient of correlation so as to simplify the decision and avoid a decimal number.

A second "standard" switch 96 can be used to set another "standard" for the five dollar bill, or and the DSP can be programmed to run a second regression analysis against this standard and the last spatial distribution of light received from the sensor 32. If a high coefficient of correlation between each spatial distribution and each of two standards is made, such would provide greater certainty that the last input bill is, in fact, a five dollar bill.

The pre-set value or correlation limit established for actuation of the output signal or LED's 72 can be increased as desired through discriminating switches 90 and 92. The non-grounded side of the more discriminating switch 90 is connected to pin 15 of the I/O expansion board. When this pin is activated, the program in the controller increases the limit of the correlation coefficient by $1/256$. When pin 16 of the micro-controller is activated by pressing the less discriminating switch 92 the correlation coefficient limit is decreased by $1/256$. The increment value, $1/256$, may be decreased by a software change for greater accuracy.

Figure 5A:
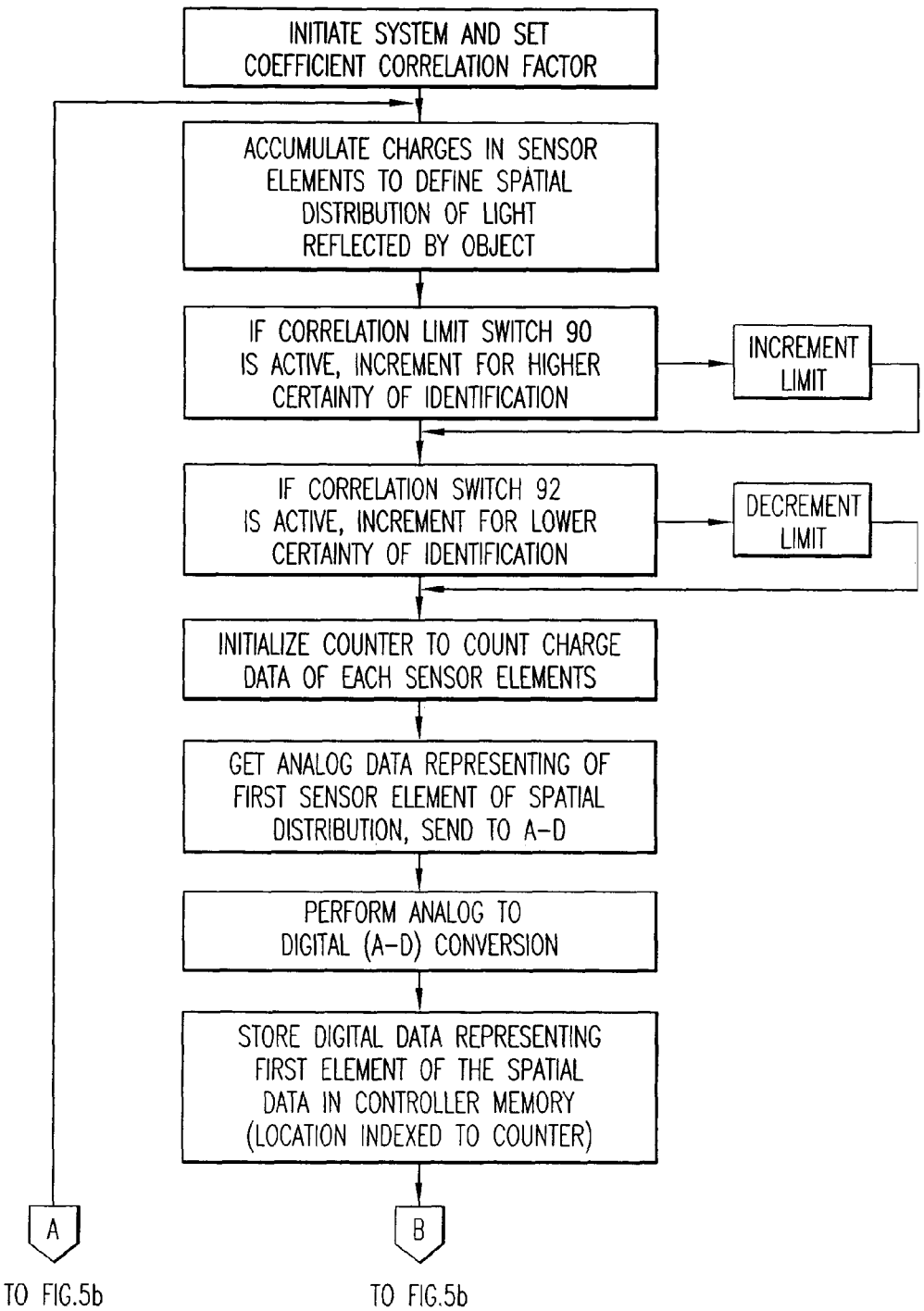
FIGS. 5a and 5b are charts depicting the functions of the software to be incorporated into the controller.
Figure 5B:
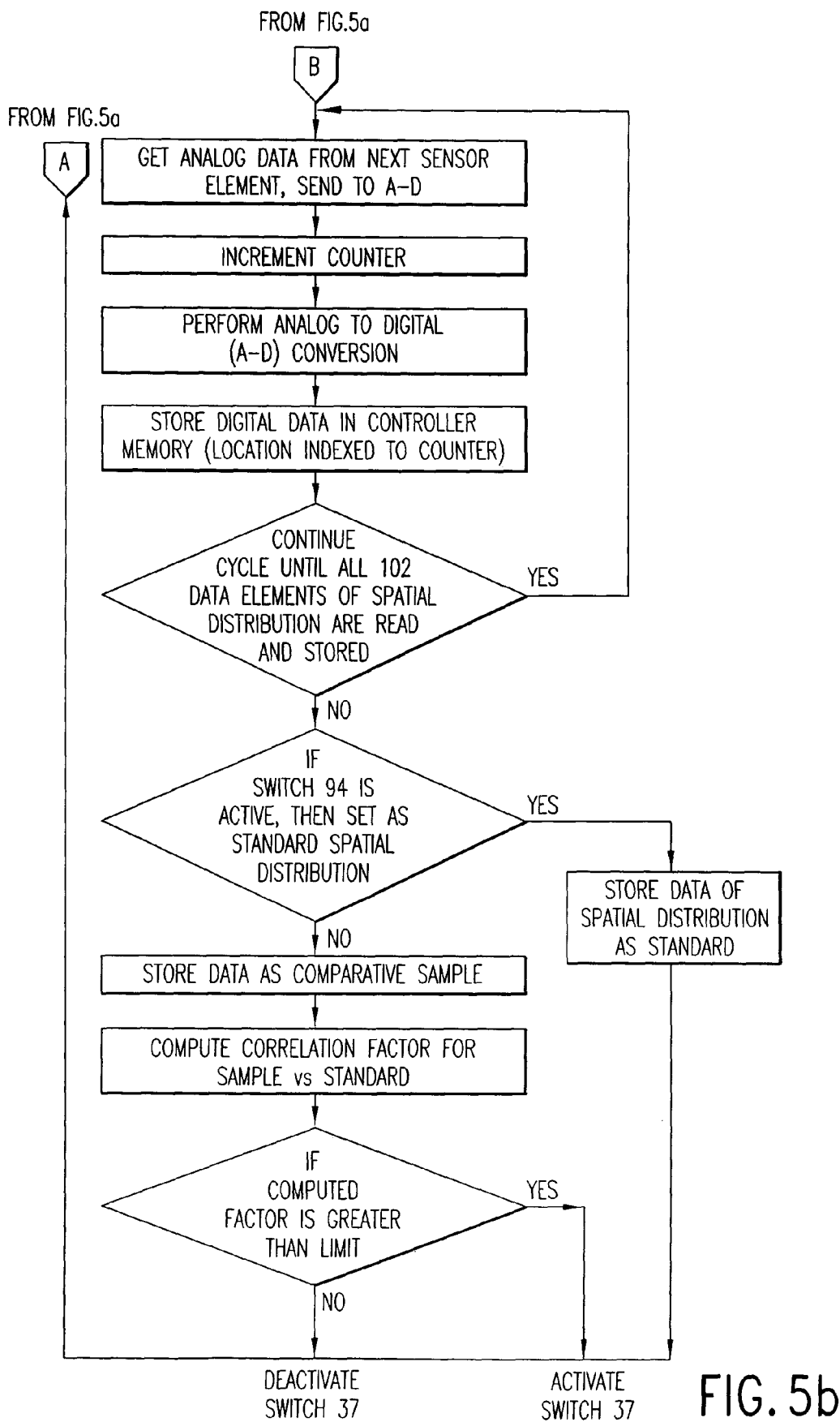

To facilitate one's understanding of this invention, the flow chart of FIGS. 5a and 5b further discloses the functions of the software of the Controller 36 as described herein. Users of controllers and DSP will know or have available from the manufacturer knowledge of the set-up routines to initiate the each of the logic chips that might be used as the controller 36. Thereafter, the steps of the program to be written for each alternative device are set forth in the flow chart.

Alternative Embodiments, Modes and Methods

Persons skilled in the art will appreciate that the disclosed scanning and identification invention can be utilized in several ways and is not limited to a specific mode. In addition, the present invention can take many forms and utilize numerous components that perform in substantially the same way to achieve substantially the same result. For example, numerous controllers or digital identifiers could be used in lieu of the preferred DSP disclosed in this specification. Those skilled in the art will appreciate that the essential functions of the digital diagnostic unit or controller 36 are those of providing memory for the storage of the spatial data and of the program steps reflecting the desired functions as well as logic circuitry having the ability to perform the desired functions and comparison. Such may include the identified chips which have a CPU and an arithmetic logic unit or its equivalent. In addition, the digital identifier 36 should have an Input/Output (I/O) capacity to receive data from the sensor array and to control at least one peripheral device such as the sensor array 20. Consequently, any of the various microcontrollers, computers, microprocessors and digital signal processors (DSP) that have the necessary components will be acceptable alternatives and may be considered for the specific application of the user. Alternatively these individual devices such as the memory and I/O devices can be purchased separately and wired together on a circuit board to accomplish the necessary functions. Indeed, the comparators or controllers of these inventions can be obtained at a low cost so as to avoid the need for investment in frame grabbers, Personal Computers or other complex systems. Moreover, other devices can be selected for greater speed. For example, TM320f2820 from Texas Instruments Inc. is several times faster than the TMS 320f243 and, on information, could make several thousand line scans and comparisons of a surface per second.

In addition to the use of alternative processors, those skilled in the art will appreciate that different lamps may be utilized and that in many cases, the lamp will not be necessary with natural light being sufficient. Too, alternative array devices that are more sensitive or have different pixel counts may be utilized instead of the TSL 1301. For example, TSL 1401 from Texas Instruments, Inc. of Dallas, Tex. will permit the collection of 128 wavelength sectors rather than 102. And though the invention preferably uses a regression analysis to develop a coefficient of correlation, the invention may well provide the desired accuracy of object identification by merely comparing only three or four data points of the spatial light pattern. This could be accomplished by use of 3 or 4 discrete sensors properly located to sense the desired wavelengths of light and a simple comparison program that does not require a regression analysis or computation of the coefficient of correlation. A multiplicity of linear arrays or an area array, could be used to reduce the number of sensor units, with each column representing spectral information equivalent to one sensor unit. Those skilled in the art will also appreciate that, for purposes of this invention, CCD arrays will generally be equivalent to CMOS arrays with the CMOS devices being faster, but somewhat less accurate.

In another alternative, the light source 24 of FIG. 1 may be replaced by a set of multi-color lamps such as a red, green, blue and near infrared. The DSP could be programmed to turn on and off each lamp separately and digitize four images, one with reflected spatial distribution of light with each different lamp color. When the standard switch is activated, the DSP stores each spatial distribution as a standard in a separate memory location of the DSP or in additional associated memory. Future spatial distributions using all four colors from additional objects are compared to each standard using the regression analysis or a simple algorithm. The resulting analysis thus brings color into the diagnostic role of this invention. A decision could be made if any one of the four object spatial distributions provided a high correlation coefficient or comparison with any one or more of the four colored standard spatial distributions. Alternatively, the DSP could be programmed to require that there be a high correlation coefficient for all of the four color distributions before a positive output signal is activated.

Alternatively, the DSP could be programmed to add the four standard spatial distributions of each of the separate colors together to provide 4 times 102 or 408 data points and additional objects can be evaluated by a correlation analysis between the 408 data points of the standard and the 408 data points of the additional objects.

In yet another alternative, the imager 32 of FIG. 1 could be replaced with a color linear array such as KLI-2113 Tri-Linear Color Array Sensor manufactured and sold by the Eastman Kodak Company of Rochester, N.Y. Such would also provide the ability to include color in the discriminating process along a line. These arrays have three rows of photo elements and each is covered with red, green or blue filter strips for spectral separation. In addition, each row has a separate output and would use three of the digital converter inputs of the DSP. The logic and comparison are the same as described above. As persons skilled in the art will appreciate, other filters, such as a rainbow filter, can be used with the wide choices of linear arrays to also obtain spectral information. Alternatively, those skilled in the art will appreciate that the sensor unit 20 of my prior application, Ser. No. 09/849,831, further identified above, can also be operated in conjunction with a controller 36 of the present disclosure to add a spectral, color identification of an object to the spatial identification of the present disclosure. Under such a combination, both sensors would be tied to the controller 36 and it would be programmed to receive a standard spectral distribution as well as a standard spatial distribution and to run sequential correlation routines with the spectral and the spatial distributions.

Those skilled in the art will also appreciate that the controller 36 or the DSP can be programmed to run the correlation analysis in different ways. For example, the controller can programmed to run the correlation algorithm with on some or all of the data points of the "standard" spatial distribution and a similar selection of data points of the actual objects. Indeed, in some applications, the user will find that a limited number of data points control the decision making process at hand. In identifying denominations of bills of the United States, one might want to focus on the spatial distributions obtained from reflections of light from the green lamp or reflections through a green filter. Such provides additional spectral information that will aid in the identification process. Finally, the inventions disclosed herein could be coupled with the full spectral identifier of my copending application, Ser. No. 09/849,831 entitled DIGITAL SPECTRAL IDENTIFIER-CONTROLLER AND RELATED METHODS filed May 4, 2001 to provide a combination spectral-spatial identifier.

Those skilled in the various arts will also appreciate that the present inventions have broad uses in other diagnostic operations such as safety and security. For example, the unit could be mounted adjacent to an entrance to a home with the switch 94 being activated to establish the existing condition. Thereafter, if a person were to come into the view of the lens, a different spatial arrangement would be disclosed by the sensor array and the comparator can be programmed to set off alarms upon diagnosing a condition different from the "standard," i.e., an unauthorized entry. Under such circumstances, those skilled in the art would appreciate that the standard or existing condition may be changed or refreshed periodically to accommodate a change caused by shadows resulting from movement of the sun or other reflected light. Similarly, the unit might be mounted on a machine tool or press with the switch 94 being activated to establish that condition. Thereafter, if the press were to be closed while the operator's hand was inside the press, the sensor could set off and alarm or disconnect power from the press upon diagnosing a conditions different from the "standard" or safe condition. Indeed, other uses and modifications of this invention such as these will be apparent to those of ordinary skill in the art from the contents of this application.

I claim:

1. A low cost machine vision apparatus for reducing the cost of conventional machine vision products, their inspection and quality control processes by eliminating the need for personal computers and frame grabbers, said apparatus comprising:

a) a lens for directing reflected light from objects upon a sensor array to obtain electronic data in spatial segments representative of said objects;

b) a low cost controller for obtaining the electronic data representative of said reflected light from a selected object and for obtaining data representative of additional reflections of light in spatial segments from additional objects;

c) said controller including a digital logic chip for comparing the data obtained from said selected object with the data representative of additional reflections in accord with an algorithm and for generating a signal indicative of the results of said comparison.

2. An apparatus as recited in claim 1 in which said apparatus includes an A-D converter for converting the data to digital form and for facilitating said comparison.

3. An apparatus as recited in claim 1 in which said controller comprises a microcontroller having a first memory for receiving reflected light from said selected object and a second memory for receiving data representative of the additional reflections.

4. An apparatus as recited in claim 1 in which said controller is a digital signal processor.

5. An apparatus as recited in claim 4 in which said controller is programmed to repeatedly obtain additional reflections and to make said comparisons in real time and at high speed.

6. A low cost, optical inspection apparatus for optical surface inspection of an object, said apparatus comprising:
    a) a lens unit for directing light from an acceptable, standard surface of an object upon a sensor array;
    b) a low cost comparator connected to said sensor array and having a first memory for receiving and storing signals representative of the magnitude of the light from the acceptable, standard surface of the object;
    c) said comparator having associated additional memory for receiving from said array signals reflecting the magnitude of the light from additional surfaces of the object;
    d) said comparator also having a logic unit and a control algorithm for comparing the similarity of the signals of the standard with the signals of the light reflected from additional surfaces of an object and for indicating the results of said comparison.

7. An optical inspection apparatus as recited in claim 6 in which the signals representative of the standard are taken from along a first line on the leading edge of said object.

8. An optical inspection apparatus as recited in claim 6 in said sequential signals are taken from segments on the surface of different objects.

9. An optical inspection apparatus as recited in claim 6 in which said the results includes identification of a deviation from the acceptable standard surface.

10. An optical inspection apparatus as recited in claim 6 in which said apparatus has an analog to digital converter for converting said signals to digital information.

11. An apparatus as recited in claim 6 in which said controller is a Digital Signal Processor.

12. A low cost, real time, digital diagnostic inspection unit for examining an object, said apparatus comprising:
    a) a digital identifier having an associated first memory containing "standard" electronic information representative of light from spatial segments of an object and a second associated memory containing electronic information representative of light from spatial segments of an object to be inspected;
    b) said identifier having a logic unit for comparing the electronic information of the object to be inspected with the standard electronic information and for providing an output signal indicative of similarity of the standard with the object.

13. An apparatus as recited in claim 12 in which said standard electronic information is taken from a manufactured part.

14. An apparatus as recited in claim 12 in which said digital identifier comprises a digital signal processor.

15. An apparatus as recited in claim 12 which includes a means for including spectral electronic information of the reflected light.

16. A low cost, optical method for inspecting an object, said method comprising the steps of
    a) obtaining digital data representing a spatial distribution of light taken directly from an object and placing same in electronic memory as a standard of comparison;
    b) obtaining digital data representing a spatial distribution of light from another object to be inspected and placing same in electronic memory;
    c) comparing said digital data of said spatial distribution of the standard of comparison with the digital data of reflected light from said other object through a regression algorithm to determine the similarity and/or dissimilarity of said objects, said comparison being made with a low cost chip having an arithmetic logic unit.

17. A method as recited in claim 16 in which the spatial distribution includes a color distribution.

18. A method as recited in claim 16 in which the spatial distribution comparison includes a full spectrum color comparison.

19. A method as recited in claim 16 in which said comparison is performed by an algorithm in a digital comparator.

20. A low cost, high speed method for surface inspection of plastic, metal, woven and non-woven materials, said method comprising the steps of
    a) obtaining digital data representing a spatial distribution of light from a plurality of segments of a line of a material without flaws and placing same in electronic memory as a standard of comparison;
    b) obtaining digital data representing a second spatial distribution of light from a plurality of segments along an additional line of said material;
    c) comparing said spatial distributions of light to determine the similarity of the standard of comparison with the additional line of material to identify the presence of flaws, if any, said comparison being made with a low cost chip having an arithmetic logic unit.

21. A method as recited in claim 20 in which a plurality of spatial distributions of light are taken along surface increments of the materials and are compared at high speeds to determine the conformity of the surface of the material with the standard.

22. A method as recited in claim 20 in which spatial distribution includes information pertaining to the color of the material.

23. A low cost vision apparatus for detecting a change in conditions, said apparatus comprising:
    a) a lens for focusing a spatial distribution of light from a target section representing specific conditions upon a sensor array;
    b) a sensor array for receiving said distribution and for generating electronic data representative of said distribution;
    c) a comparator for obtaining the electronic data representing the specific conditions and for obtaining electronic data from a sensor array representing subsequent conditions;
    d) said comparator containing a logic unit and an algorithm for comparing the specific conditions with the subsequent conditions and for providing a signal indicating the results of the comparison.

24. A vision apparatus as recited in claim 23 in which said vision apparatus is mounted as a safety device adjacent a machine press and the specific condition is one in which a person's appendages are not within an unsafe position on the press.

25. A vision apparatus as recited in claim 23 in which said vision apparatus is mounted as a security device adjacent an area to be monitored against unauthorized entry and the specific condition is one in which a person is not within the specific conditions.

26. An apparatus as recited in claim 23 in which said sensor array receiving said distribution from said target section is the same as the sensor array representing subsequent conditions.

27. An apparatus as recited in claim 23 in which said apparatus has a switch for generating electronic data representative of said distribution of said specific conditions.

28. An apparatus as recited in claim 27 said comparator repeatedly compares said specific conditions with said subsequent conditions.

29. A low cost vision scanning method for the inspection, identification and/or diagnostic evaluation of an objects, tissue, and/or material, said scanning method comprising:
   a) simultaneously obtaining digital data reflecting a first spatial distribution of light from an object, tissue, and/or material;
   b) repeatedly obtaining digital data reflecting additional spatial distributions of light from other objects, tissue, and/or materials;
   c) electronically comparing said first spatial distribution of light with said additional spatial distributions of light with a low cost chip having an arithmetic logic unit to determine the similarity and/or difference between them; and
   d) emitting a signal reflecting the similarity and/or difference.

* * * * *